US008710172B2

(12) United States Patent
Wang et al.

(10) Patent No.: US 8,710,172 B2
(45) Date of Patent: Apr. 29, 2014

(54) BIODEGRADABLE ALIPHATIC-AROMATIC COPOLYESTER FOR USE IN NONWOVEN WEBS

(75) Inventors: James H. Wang, Appleton, WI (US); Aimin He, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1047 days.

(21) Appl. No.: 12/307,384

(22) PCT Filed: Jul. 14, 2006

(86) PCT No.: PCT/US2006/027337
§ 371 (c)(1),
(2), (4) Date: Apr. 7, 2009

(87) PCT Pub. No.: WO2008/008068
PCT Pub. Date: Jan. 17, 2008

(65) Prior Publication Data
US 2009/0291607 A1     Nov. 26, 2009

(51) Int. Cl.
*C08G 63/02* (2006.01)
*C08G 63/00* (2006.01)

(52) U.S. Cl.
USPC .......................................... 528/272; 525/437

(58) Field of Classification Search
USPC ........... 528/272, 278; 521/141; 524/141, 145, 524/601
See application file for complete search history.

(56) References Cited

U.S. PATENT DOCUMENTS

| 3,884,850 | A | 5/1975 | Ostrowski |
| 4,554,344 | A | 11/1985 | Jackson, Jr. et al. |
| 4,797,468 | A | 1/1989 | De Vries |
| 4,970,288 | A | 11/1990 | Larkin et al. |
| 5,039,783 | A | 8/1991 | Brunelle et al. |
| 5,053,482 | A | 10/1991 | Tietz |
| 5,108,820 | A | 4/1992 | Kaneko et al. |
| 5,108,827 | A | 4/1992 | Gessner |
| 5,130,073 | A | 7/1992 | Meirowitz et al. |
| 5,166,310 | A | 11/1992 | Rooney |
| 5,188,885 | A | 2/1993 | Timmons et al. |
| 5,231,161 | A | 7/1993 | Brunelle et al. |
| 5,262,460 | A | 11/1993 | Suzuki et al. |
| 5,270,401 | A | 12/1993 | Sham et al. |
| 5,292,783 | A | 3/1994 | Buchanan et al. |
| 5,310,599 | A | 5/1994 | Ford |
| 5,336,552 | A | 8/1994 | Strack et al. |
| 5,350,624 | A | 9/1994 | Georger et al. |
| 5,378,801 | A | 1/1995 | Reichert et al. |
| 5,382,400 | A | 1/1995 | Pike et al. |
| 5,407,984 | A | 4/1995 | Brunelle et al. |
| 5,432,000 | A | 7/1995 | Young, Sr. et al. |
| 5,446,079 | A | 8/1995 | Buchanan et al. |
| 5,464,688 | A | 11/1995 | Timmons et al. |
| 5,466,517 | A | 11/1995 | Eschwey et al. |
| 5,470,944 | A | 11/1995 | Bonsignore |
| 5,521,278 | A | 5/1996 | O'Brien et al. |
| 5,525,706 | A | 6/1996 | Gruber et al. |
| 5,527,976 | A | 6/1996 | Takekoshi et al. |
| 5,543,494 | A | 8/1996 | Perego et al. |
| 5,554,657 | A | 9/1996 | Brownscombe et al. |
| 5,559,171 | A | 9/1996 | Buchanan et al. |
| 5,574,129 | A | 11/1996 | Miyoshi et al. |
| 5,580,911 | A | 12/1996 | Buchanan et al. |
| 5,593,778 | A | 1/1997 | Kondo et al. |
| 5,599,858 | A | 2/1997 | Buchanan et al. |
| 5,614,298 | A | 3/1997 | Tanaka et al. |
| 5,633,342 | A | 5/1997 | Verser et al. |
| 5,668,186 | A | 9/1997 | Brunelle et al. |
| 5,688,582 | A | 11/1997 | Nagaoka et al. |
| 5,714,569 | A | 2/1998 | Imaizumi et al. |
| 5,753,736 | A | 5/1998 | Bhat et al. |
| 5,763,564 | A | 6/1998 | Gruber et al. |
| 5,770,682 | A | 6/1998 | Ohara et al. |
| 5,783,505 | A | 7/1998 | Duckett et al. |
| 5,807,973 | A | 9/1998 | Gruber et al. |
| 5,817,199 | A | 10/1998 | Brennecke et al. |
| 5,817,721 | A | 10/1998 | Warzelhan et al. |
| 5,821,327 | A | 10/1998 | Oota et al. |
| 5,844,066 | A | 12/1998 | Kakizawa |

(Continued)

FOREIGN PATENT DOCUMENTS

| EP | 0731198 A2 | 9/1996 |
| EP | 0731198 A3 | 9/1996 |

(Continued)

OTHER PUBLICATIONS

Abstract of Korean Patent No. KR1020010057068A, Jul. 4, 2001.
Abstract of Korean Patent No. KR1020030022514A, Mar. 17, 2003.
Abstract of Korean Patent No. KR1020040005193A, Jan. 16, 2004.
Abstract of Korean Patent No. KR1020040005194A, Jan. 16, 2004.
ASTM D 1117-97—*Standard Test Methods for Nonwoven Fabrics*, Mar. 10, 1997, pp. 311-313.
ASTM D 1238-04c—*Standard Test Method for Melt Flow Rates of Thermoplastics by Extrusion Plastometer*, current edition approved Dec. 1, 2004, originally approved in 1965, pp. 1-14.

(Continued)

*Primary Examiner* — Ling-Siu Choi
*Assistant Examiner* — Monique Peets
(74) *Attorney, Agent, or Firm* — Dority & Manning, P.A.

(57) ABSTRACT

A method for forming a biodegradable aliphatic-aromatic copolyester suitable for use in fibers is provided. In one embodiment, for example, an aliphatic-aromatic copolyester is melt blended with an alcohol to initiate an alcoholysis reaction that results in a copolyester having one or more hydroxyalkyl or alkyl terminal groups. By selectively controlling the alcoholysis conditions (e.g., alcohol and copolymer concentrations, catalysts, temperature, etc.), a modified aliphatic-aromatic copolyester may be achieved that has a molecular weight lower than the starting aliphatic-aromatic polymer. Such lower molecular weight polymers also have the combination of a higher melt flow index and lower apparent viscosity, which is useful in a wide variety of fiber forming applications, such as in the meltblowing of nonwoven webs.

30 Claims, 4 Drawing Sheets

(56) References Cited

U.S. PATENT DOCUMENTS

| | | |
|---|---|---|
| 5,851,937 A | 12/1998 | Wu et al. |
| 5,866,677 A | 2/1999 | Maeda et al. |
| 5,880,254 A | 3/1999 | Ohara et al. |
| 5,883,199 A | 3/1999 | McCarthy et al. |
| 5,895,710 A | 4/1999 | Sasse et al. |
| 5,900,322 A | 5/1999 | Buchanan et al. |
| 5,910,545 A | 6/1999 | Tsai et al. |
| 5,912,275 A | 6/1999 | Hall et al. |
| 5,945,480 A | 8/1999 | Wang et al. |
| 5,952,433 A | 9/1999 | Wang et al. |
| 5,962,112 A | 10/1999 | Haynes et al. |
| 5,981,694 A | 11/1999 | Gruber et al. |
| 6,045,908 A | 4/2000 | Nakajima et al. |
| 6,063,895 A | 5/2000 | Chung et al. |
| 6,075,118 A | 6/2000 | Wang et al. |
| 6,090,494 A | 7/2000 | Rao |
| 6,096,855 A | 8/2000 | Sodergard et al. |
| 6,111,060 A | 8/2000 | Gruber et al. |
| 6,143,863 A | 11/2000 | Gruber et al. |
| 6,177,193 B1 | 1/2001 | Tsai et al. |
| 6,194,483 B1 | 2/2001 | Tsai et al. |
| 6,197,860 B1 | 3/2001 | Tsai et al. |
| 6,200,669 B1 | 3/2001 | Marmon et al. |
| 6,201,068 B1 | 3/2001 | Tsai et al. |
| 6,218,321 B1 | 4/2001 | Lorcks et al. |
| 6,225,388 B1 | 5/2001 | Tsai et al. |
| 6,235,393 B1 | 5/2001 | Kimura et al. |
| 6,245,831 B1 | 6/2001 | Tsai et al. |
| 6,258,924 B1 | 7/2001 | Warzelhan et al. |
| 6,262,294 B1 | 7/2001 | Sako et al. |
| 6,268,434 B1 | 7/2001 | Tsai et al. |
| 6,326,458 B1 | 12/2001 | Gruber et al. |
| 6,355,772 B1 | 3/2002 | Gruber et al. |
| 6,399,716 B2 | 6/2002 | Chung et al. |
| 6,420,027 B2 | 7/2002 | Kimura et al. |
| 6,420,048 B1 | 7/2002 | Wang |
| 6,495,656 B1 * | 12/2002 | Haile et al. .................... 528/272 |
| 6,500,897 B2 | 12/2002 | Wang et al. |
| 6,506,873 B1 | 1/2003 | Ryan et al. |
| 6,521,336 B2 | 2/2003 | Narita et al. |
| 6,525,164 B2 | 2/2003 | Faler |
| 6,544,455 B1 | 4/2003 | Tsai |
| 6,552,124 B2 | 4/2003 | Wang et al. |
| 6,552,162 B1 | 4/2003 | Wang et al. |
| 6,562,938 B2 | 5/2003 | Haile et al. |
| 6,562,939 B1 | 5/2003 | Farachi et al. |
| 6,576,576 B1 | 6/2003 | Wang et al. |
| 6,579,934 B1 | 6/2003 | Wang et al. |
| 6,607,996 B1 | 8/2003 | Matsunaga et al. |
| 6,623,853 B2 | 9/2003 | Branum et al. |
| 6,623,854 B2 | 9/2003 | Bond |
| 6,635,799 B1 | 10/2003 | Osborn, III et al. |
| 6,660,211 B2 | 12/2003 | Topolkaraev et al. |
| 6,686,303 B1 | 2/2004 | Haynes et al. |
| 6,709,526 B1 | 3/2004 | Bailey et al. |
| 6,713,595 B2 | 3/2004 | Chung et al. |
| 6,740,401 B1 | 5/2004 | Yahata et al. |
| 6,743,506 B2 | 6/2004 | Bond et al. |
| 6,756,412 B2 | 6/2004 | Muzzy |
| 6,783,854 B2 | 8/2004 | Bond |
| 6,787,493 B1 | 9/2004 | Nagaoka et al. |
| 6,802,895 B2 | 10/2004 | Mackey et al. |
| 6,811,740 B2 | 11/2004 | James et al. |
| 6,838,403 B2 | 1/2005 | Tsai et al. |
| 6,863,971 B2 | 3/2005 | Halahmi et al. |
| 6,872,674 B2 | 3/2005 | Williams et al. |
| 6,890,872 B2 | 5/2005 | Bond et al. |
| 6,890,989 B2 | 5/2005 | Wang et al. |
| 6,905,759 B2 | 6/2005 | Topolkaraev et al. |
| 6,946,195 B2 | 9/2005 | Griffith et al. |
| 6,946,506 B2 | 9/2005 | Bond et al. |
| 6,953,622 B2 | 10/2005 | Tsai et al. |
| 7,001,562 B2 | 2/2006 | Schiffer et al. |
| 7,029,620 B2 | 4/2006 | Gordon et al. |
| 7,037,983 B2 | 5/2006 | Huang et al. |
| 7,053,151 B2 | 5/2006 | Wang et al. |
| 7,060,867 B2 | 6/2006 | Jameson |
| 7,067,611 B2 | 6/2006 | Yamane et al. |
| 7,077,994 B2 | 7/2006 | Bond et al. |
| 7,101,623 B2 | 9/2006 | Jordan et al. |
| 7,153,569 B2 | 12/2006 | Kaufman et al. |
| 7,173,080 B2 | 2/2007 | Yamada et al. |
| 7,193,032 B2 | 3/2007 | Culbert et al. |
| 7,196,157 B2 | 3/2007 | Bastioli et al. |
| 7,241,838 B2 | 7/2007 | Shelby et al. |
| 7,288,618 B2 | 10/2007 | Bastioli et al. |
| 7,332,562 B2 | 2/2008 | Chen et al. |
| 7,361,725 B2 | 4/2008 | Yu |
| 7,368,503 B2 | 5/2008 | Hale |
| 7,468,335 B2 | 12/2008 | Imes et al. |
| 2002/0127939 A1 | 9/2002 | Hwo et al. |
| 2002/0168912 A1 | 11/2002 | Bond et al. |
| 2003/0022569 A1 | 1/2003 | Lee et al. |
| 2003/0022581 A1 | 1/2003 | Tsai et al. |
| 2003/0092343 A1 | 5/2003 | Bond et al. |
| 2003/0134915 A1 | 7/2003 | Scantlebury et al. |
| 2003/0176136 A1 | 9/2003 | Wadsworth |
| 2003/0191442 A1 | 10/2003 | Bewick-Sonntag et al. |
| 2004/0000313 A1 | 1/2004 | Gaynor et al. |
| 2004/0002273 A1 | 1/2004 | Fitting et al. |
| 2004/0053047 A1 | 3/2004 | Jackson et al. |
| 2004/0102123 A1 | 5/2004 | Bowen, Jr. et al. |
| 2004/0132873 A1 | 7/2004 | Bailey et al. |
| 2005/0054999 A1 | 3/2005 | Morman et al. |
| 2005/0112350 A1 | 5/2005 | Ning |
| 2005/0112363 A1 | 5/2005 | Ning |
| 2005/0208294 A1 | 9/2005 | Kaufman et al. |
| 2006/0094320 A1 | 5/2006 | Chen et al. |
| 2006/0116487 A1 | 6/2006 | Brunelle et al. |
| 2007/0082573 A1 | 4/2007 | Noda et al. |
| 2007/0219339 A1 | 9/2007 | Fregoso-Infante et al. |

FOREIGN PATENT DOCUMENTS

| | | |
|---|---|---|
| EP | 0905292 A1 | 3/1999 |
| EP | 1215225 A1 | 6/2002 |
| EP | 1236753 A1 | 9/2002 |
| EP | 1345979 B1 | 9/2003 |
| EP | 1397536 B1 | 3/2004 |
| EP | 1397537 B1 | 3/2004 |
| EP | 1397538 B1 | 3/2004 |
| EP | 1397539 B1 | 3/2004 |
| EP | 1497353 B1 | 1/2005 |
| EP | 1674502 A1 | 6/2006 |
| JP | 7062180 A | 3/1995 |
| JP | 7109659 | 4/1995 |
| JP | 7125128 | 5/1995 |
| JP | 8193123 A | 7/1996 |
| JP | 9241417 A | 9/1997 |
| JP | 11043857 | 2/1999 |
| JP | 11050369 | 2/1999 |
| JP | 11117164 | 4/1999 |
| JP | 11286864 | 10/1999 |
| JP | 2001172829 A | 6/2001 |
| JP | 2001-29664 | * 10/2001 |
| JP | 2003064568 | 3/2003 |
| JP | 2003193349 A | 7/2003 |
| JP | 2004189770 A | 7/2004 |
| JP | 2005048350 A | 2/2005 |
| WO | WO 9741165 A1 | 11/1997 |
| WO | WO 9836008 A1 | 8/1998 |
| WO | WO 9850611 A1 | 11/1998 |
| WO | WO 9928368 A1 | 6/1999 |
| WO | WO 0017270 A1 | 3/2000 |
| WO | WO 02090629 A1 | 11/2002 |
| WO | WO 02090630 A1 | 11/2002 |
| WO | WO 03089492 A1 | 10/2003 |
| WO | WO 03089493 A1 | 10/2003 |
| WO | WO 03099910 A1 | 12/2003 |
| WO | WO 2004061172 A2 | 7/2004 |
| WO | WO 2004061172 A3 | 7/2004 |
| WO | WO 2007070064 A1 | 6/2007 |
| WO | WO 2008008067 A1 | 1/2008 |

(56) References Cited

FOREIGN PATENT DOCUMENTS

| WO | WO 2008008068 A1 | 1/2008 |
|----|------------------|--------|
| WO | WO 2008008074 A1 | 1/2008 |
| WO | WO 2008073099 A1 | 6/2008 |

OTHER PUBLICATIONS

ASTM D 1239-92—*Standard Test Method for Resistance of Plastic Films to Extraction by Chemicals*, current edition approved Aug. 15, 1992, pp. 281-282.

ASTM D 3418-03 (D 3417-99)—*Standard Test Method for Transition Temperatures and Enthalpies of Fusion and Crystallization of Polymers by Differential Scanning Calorimetry*, current edition approved Dec. 1, 2003, originally approved in 1975, pp. 66-72.

ASTM D 5034-95—*Standard Test Method for Breaking Strength and Elongation of Textile Fabrics (Grab Test)*, current edition approved May 15, 1995, pp. 674-681.

ASTM D 5338-92—*Standard Test Method for Determining Aerobic Biodegradation of Plastic Materials Under Controlled Composting Conditions*, current edition approved Dec. 15, 1992, pp. 456-461.

ASTM D 7191-05—*Standard Test Method for Determination of Moisture in Plastics by Relative Humidity Sensor*, current edition approved Nov. 1, 2005, pp. 1-4.

Article—*Biodegradation of aliphatic-aromatic copolyesters: evaluation of the final biodegradability and ecotoxicological impact of degradation intermediates*, Witt et al., Chemosphere 44, 2001, pp. 289-299.

Article—*Rheological Properties of Poly(lactides). Effect of Molecular Weight and Temperature on the Viscoelasticity of Poly(l-lactic acid)*, Cooper-White et al., Journal of Polymer Science: Part B: Polymer Physics, vol. 37, 1999, pp. 1803-1814.

Article—*Synthesis of Oligoester α,ω-diols by Alcoholysis of PET through the Reactive Extrusion Process*, Dannoux et al., The Canadian Journal of Chemical Engineering, vol. 80, Dec. 2002, pp. 1075-1082.

Product Information on Ecoflex® from BASF—The Chemical Company, Sep. 22, 2005, 4 pages.

Product Information from Ingeo and NatureWorks®—PLA Polymer 6201D, 6202D, and 6302D, 2005, 11 pages.

International Search Report and Written Opinion for PCT/US2006/027337 dated Oct. 25, 2006.

Related U.S. Patent Applications.

European Search Report for 06787273.9-2109/2041341 (PCT/US2006/027337) dated Nov. 13, 2009, 5 pages.

\* cited by examiner

BIODEGRADABLE ALIPHATIC-AROMATIC COPOLYESTER FOR USE IN NONWOVEN WEBS

BACKGROUND OF THE INVENTION

Biodegradable nonwoven webs are useful in a wide range of applications, such as in the formation of disposable absorbent products (e.g., diapers, training pants, sanitary wipes, feminine pads and liners, adult incontinence pads, guards, garments, etc.). To facilitate formation of the nonwoven web, a biodegradable polymer should be selected that is melt processable, yet also has good mechanical and physical properties. Biodegradable aliphatic-aromatic copolyesters have been developed that possess good mechanical and physical properties. Although various attempts have been made to use aliphatic-aromatic copolyesters in the formation of nonwoven webs, their relatively high molecular weight and viscosity have generally restricted their use to only certain types of film forming processes, but not fiber forming processes. For example, conventional aliphatic-aromatic copolyesters are not typically suitable for meltblowing processes, which require a low polymer viscosity for successful microfiber formation. As such, a need currently exists for a biodegradable aliphatic-aromatic copolyester that exhibits good mechanical and physical properties, but which may be readily formed into a nonwoven web using a variety of techniques (e.g., meltblowing).

SUMMARY OF THE INVENTION

In accordance with one embodiment of the present invention, a method for forming a biodegradable polymer for use in fiber formation is disclosed. The method comprises melt blending a first aliphatic-aromatic copolyester with at least one alcohol so that the copolyester undergoes an alcoholysis reaction. The alcoholysis reaction results in a second, modified copolyester having a melt flow index that is greater than the melt flow index of the first copolyester, determined at a load of 2160 grams and temperature of 190° C. in accordance with ASTM Test Method D1238-E.

In accordance with another embodiment of the present invention, a fiber is disclosed that comprises a biodegradable aliphatic-aromatic copolyester terminated with an alkyl group, hydroxyalkyl group, or a combination thereof. The copolyester has a melt flow index of from about 5 to about 500 grams per 10 minutes, determined at a load of 2160 grams and temperature of 190° C. in accordance with ASTM Test Method D1238-E.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
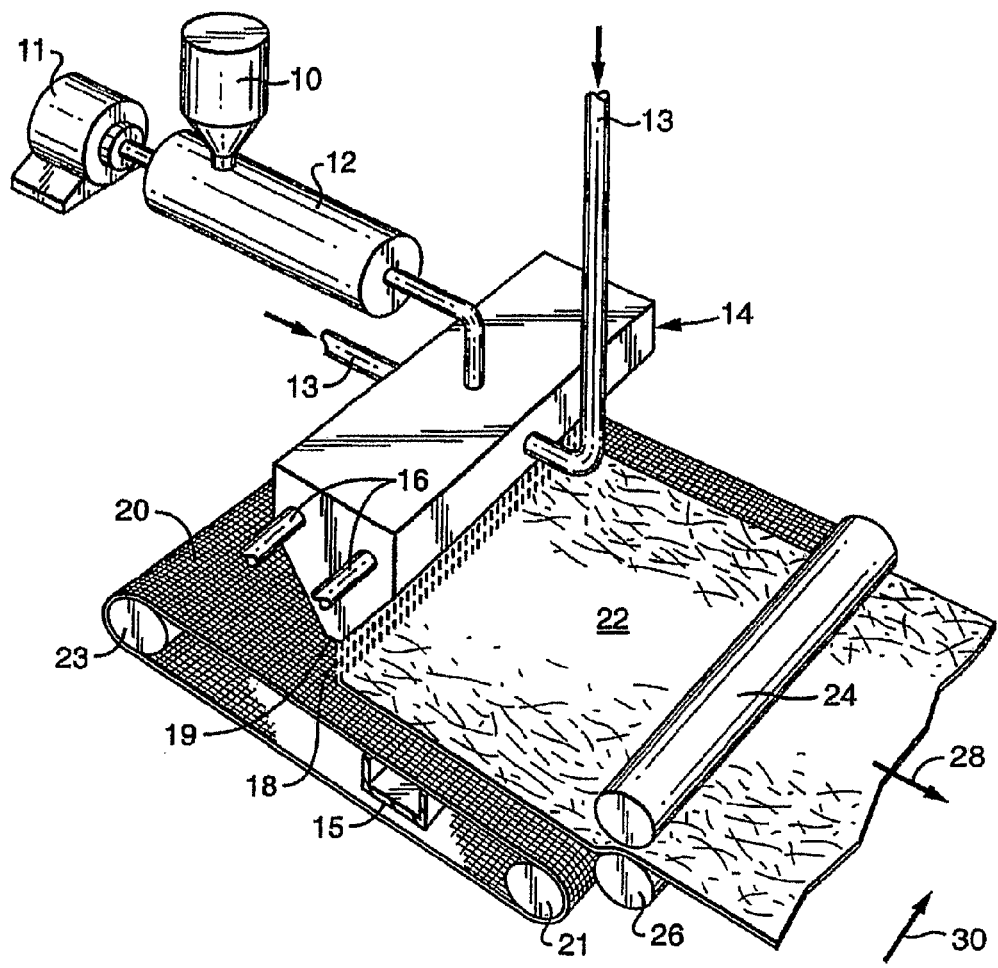
FIG. 1 is a schematic illustration of a process that may be used in one embodiment of the present invention to form a nonwoven web.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "fibers" refer to elongated extrudates formed by passing a polymer through a forming orifice such as a die. Unless noted otherwise, the term "fibers" includes discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. Nos. 5,277,976 to Hogle, et al., 5,162,074 to Hills, 5,466,410 to Hills, 5,069,970 to Largman, et al., and 5,057,368 to Largman, et al., which are incorporated herein in their entirety by reference thereto for all purposes.

As used herein, the term "multiconstituent" refers to fibers formed from at least two polymers (e.g., biconstituent fibers) that are extruded from the same extruder. The polymers are not arranged in substantially constantly positioned distinct zones across the cross-section of the fibers. Various multiconstituent fibers are described in U.S. Pat. No. 5,108,827 to Gessner, which is incorporated herein in its entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. Nos. 3,849,241 to Butin, et al.; 4,307,143 to Meitner, et al.; and 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers.

As used herein, the term "carded web" refers to a web made from staple fibers that are sent through a combing or carding unit, which separates or breaks apart and aligns the staple fibers in the machine direction to form a generally machine direction-oriented fibrous nonwoven web. Such fibers are usually obtained in bales and placed in an opener/blender or picker, which separates the fibers prior to the carding unit. Once formed, the web may then be bonded by one or more known methods.

As used herein, the term "airlaid web" refers to a web made from bundles of fibers having typical lengths ranging from about 3 to about 19 millimeters (mm). The fibers are separated, entrained in an air supply, and then deposited onto a forming surface, usually with the assistance of a vacuum supply. Once formed, the web is then bonded by one or more known methods.

As used herein, the term "coform web" generally refers to a composite material containing a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. Nos. 4,100,324 to Anderson, et al.; 5,284,703 to Everhart, et al.; and 5,350,624 to Georger, et al.; which are incorporated herein in their entirety by reference thereto for all purposes.

DETAILED DESCRIPTION

The present invention is directed to a method for forming a biodegradable aliphatic-aromatic copolyester suitable for use in fibers. In one embodiment, for example, an aliphatic-aromatic polymer is melt blended with an alcohol to initiate an alcoholysis reaction that results in a copolyester having one or more hydroxyalkyl or alkyl terminal groups. By selectively controlling the alcoholysis conditions (e.g., alcohol and copolymer concentrations, catalysts, temperature, etc.), a modified aliphatic-aromatic copolyester may be achieved that has a molecular weight lower than the starting aliphatic-aromatic polymer. Such lower molecular weight polymers also have the combination of a higher melt flow index and lower apparent viscosity, which is useful in a wide variety of fiber forming applications, such as in the meltblowing of nonwoven webs.

I. Reaction Components

A. Aliphatic-Aromatic Copolyester

The aliphatic-aromatic copolyester may be synthesized using any known technique, such as through the condensation polymerization of a polyol in conjunction with aliphatic and aromatic dicarboxylic acids or anhydrides thereof. The polyols may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

Representative aliphatic dicarboxylic acids that may be used include substituted or unsubstituted, linear or branched, non-aromatic dicarboxylic acids selected from aliphatic dicarboxylic acids containing 2 to about 12 carbon atoms, and derivatives thereof. Non-limiting examples of aliphatic dicarboxylic acids include malonic, succinic, oxalic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 1 to about 6 carbon atoms, and derivatives thereof. Non-limiting examples of aromatic dicarboxylic acids include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the copolyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl)cyclohexane, tris(2-hydroxyethyl) isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1,2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aromatic dicarboxylic acid monomer constituent may be present in the copolyester in an amount of from about 10 mole % to about 40 mole %, in some embodiments from about 15 mole % to about 35 mole %, and in some embodiments, from about 15 mole % to about 30 mole %. The aliphatic dicarboxylic acid monomer constituent may likewise be present in the copolyester in an amount of from about 15 mole % to about 45 mole %, in some embodiments from about 20 mole % to about 40 mole %, and in some embodiments, from about 25 mole % to about 35 mole %. The polyol monomer constituent may also be present in the aliphatic-aromatic copolyester in an amount of from about 30 mole % to about 65 mole %, in some embodiments from about 40 mole % to about 50 mole %, and in some embodiments, from about 45 mole % to about 55 mole %.

In one particular embodiment, for example, the aliphatic-aromatic copolyester may comprise the following structure:

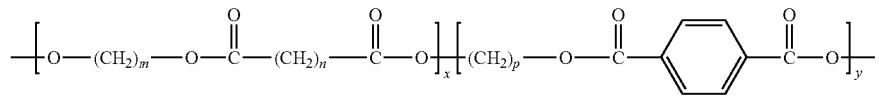

wherein, m is an integer from 2 to 10, in some embodiments from 2 to 4, and in one embodiment, 4;

n is an integer from 0 to 18, in some embodiments from 2 to 4, and in one embodiment, 4;

p is an integer from 2 to 10, in some embodiments from 2 to 4, and in one embodiment, 4;

x is an integer greater than 1; and y is an integer greater than 1. One example of such a copolyester is polybutylene adipate terephthalate, which is commercially available under the designation ECOFLEX® F BX 7011 from BASF Corp. Another example of a suitable copolyester containing an aromatic terephtalic acid monomer constituent is available under the designation ENPOL™ 8060M from IRE Chemicals (South Korea). Other suitable aliphatic-aromatic copolyesters may be described in U.S. Pat. Nos. 5,292,783; 5,446,079; 5,559,171; 5,580,911; 5,599,858; 5,817,721; 5,900,322; and 6,258,924, which are incorporated herein in their entirety by reference thereto for all purposes.

The aliphatic-aromatic polyester typically has a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polymer also typically has a weight average molecular weight ("$M_w$") ranging from about 70,000 to about 240,000 grams per mole, in some embodiments from about 80,000 to about 190,000 grams per mole, and in some embodiments, from about 100,000 to about 150,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.2 to about 2.0, and in some embodiments, from about 1.4 to about 1.8. The weight and number average molecular weights may be determined by methods known to those skilled in the art.

The aromatic-aliphatic polyester may also have an apparent viscosity of from about 100 to about 1000 Pascal seconds (Pa·s), in some embodiments from about 200 to about 800 Pa·s, and in some embodiments, from about 300 to about 600 Pa·s, as determined at a temperature of 170° C. and a shear rate of 1000 sec$^{-1}$. The melt flow index of the aromatic-aliphatic polyester may also range from about 0.1 to about 10 grams per 10 minutes, in some embodiments from about 0.5 to about 8 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 190° C.), measured in accordance with ASTM Test Method D1238-E.

The aliphatic-aromatic polymer also typically has a melting point of from about 50° C. to about 160° C., in some embodiments from about 80° C. to about 160° C., and in some embodiments, from about 10° C. to about 140° C. Such low melting point copolyesters are useful in that they biodegrade at a fast rate and are generally soft. The glass transition temperature ("$T_g$") of the copolyester is also relatively low to improve flexibility and processability of the polymers. For example, the $T_g$ may be about 25° C. or less, in some embodiments about 0° C. or less, and in some embodiments, about −10° C. or less. As discussed in more detail below, the melting temperature and glass transition temperature may be determined using differential scanning calorimetry ("DSC") in accordance with ASTM D-3417.

B. Alcohol

As indicated above, the aliphatic-aromatic copolyester may be reacted with an alcohol to form a modified copolyester having a reduced molecular weight. The concentration of the alcohol reactant may influence the extent to which the molecular weight is altered. For instance, higher alcohol concentrations generally result in a more significant decrease in molecular weight. Of course, too high of an alcohol concentration may also affect the physical characteristics of the resulting polymer. Thus, in most embodiments, the alcohol(s) are employed in an amount of about 0.1 wt. % to about 20 wt. %, in some embodiments from about 0.2 wt. % to about 10 wt. %, and in some embodiments, from about 0.5 wt. % to about 5 wt. %, based on the total weight of the starting aliphatic-aromatic copolyester.

The alcohol may be monohydric or polyhydric (dihydric, trihydric, tetrahydric, etc.), saturated or unsaturated, and optionally substituted with functional groups, such as carboxyl, amine, etc. Examples of suitable monohydric alcohols include methanol, ethanol, 1-propanol, 2-propanol, 1-butanol, 2-butanol, 1-pentanol, 2-pentanol, 3-pentanol, 1-hexanol, 2-hexanol, 3-hexanol, 1-heptanol, 2-heptanol, 3-heptanol, 4-heptanol, 1-octanol, 2-octanol, 3-octanol, 4-octanol, 1-nonanol, 2-nonanol, 3-nonanol, 4-nonanol, 5-nonanol, 1-decanol, 2-decanol, 3-decanol, 4-decanol, 5-decanol, allyl alcohol, 1-butenol, 2-butenol, 1-pentenol, 2-pentenol, 1-hexenol, 2-hexenol, 3-hexenol, 1-heptenol, 2-heptenol, 3-heptenol, 1-octenol, 2-octenol, 3-octenol, 4-octenol, 1-nonenol, 2-nonenol, 3-nonenol, 4-nonenol, 1-decenol, 2-decenol, 3-decenol, 4-decenol, 5-decenol, cyclohexanol, cyclopentanol, cycloheptanol, 1-phenythyl alcohol, 2-phenythyl alcohol, 2-ethoxy-ethanol, methanolamine, ethanolamine, and so forth. Examples of suitable dihydric alcohols include 1,3-propanediol, 1,4-butanediol, 1,5-pentanediol, 1,6-hexanediol, 1,7-heptanediol, 1,8-octanediol, 1,2-cyclohexanedimethanol, 1,3-cyclohexanedimethanol, 1-hydroxymethyl-2-hydroxyethylcyclohexane, 1-hydroxy-2-hydroxypropylcyclohexane, 1-hydroxy-2-hydroxyethylcyclohexane, 1-hydroxymethyl-2-hydroxyethylbenzene, 1-hydroxymethyl-2-hydroxypropylbenzene, 1-hydroxy-2-hydroxyethylbenzene, 1,2-benzylmethylol, 1,3-benzyldimethylol, and so forth. Suitable trihydric alcohols may include glycerol, trimethylolpropane, etc., while suitable tetrahydric alcohols may include pentaerythritol, erythritol, etc. Preferred alcohols are dihydric alcohols having from 2 to 6 carbon atoms, such as 1,3-propanediol and 1,4-butanediol.

The hydroxy group of the alcohol is generally capable of attacking an ester linkage of the aliphatic-aromatic copolyester, thereby leading to chain scission or "depolymerization" of the copolyester molecule into one or more shorter ester chains. The shorter chains may include aliphatic-aromatic polyesters or oligomers, as well as minor portions of aliphatic polyesters or oligomers, aromatic polyesters or oligomers, and combinations of any of the foregoing. Although not necessarily required, the short chain aliphatic-aromatic polyesters formed during alcoholysis are often terminated with an alkyl and/or hydroxyalkyl groups derived from the alcohol. Alkyl group terminations are typically derived from monohydric alcohols, while hydroxyalkyl group terminations are typically derived from polyhydric alcohols. In one particular embodiment, for example, an aliphatic-aromatic copolyester is formed during the alcoholysis reaction that comprises the following general structure:

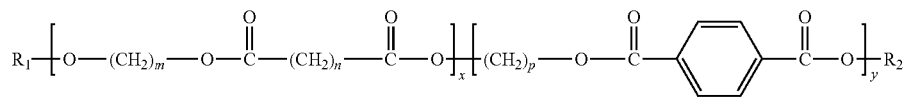

wherein, m is an integer from 2 to 10, in some embodiments from 2 to 4, and in one embodiment, 4;

n is an integer from 0 to 18, in some embodiments from 2 to 4, and in one embodiment, 4;

p is an integer from 2 to 10, in some embodiments from 2 to 4, and in one embodiment, 4;

x is an integer greater than 1;

y is an integer greater than 1; and $R_1$ and $R_2$ are independently selected from hydrogen; hydroxyl groups; straight chain or branched, substituted or unsubstituted $C_1$-$C_{10}$ alkyl groups; straight chain or branched, substituted or unsubstituted $C_1$-$C_{10}$ hydroxyalkyl groups. Preferably, at least one of $R_1$ and $R_2$, or both, are straight chain or branched, substituted or unsubstituted, $C_1$-$C_{10}$ alkyl or $C_1$-$C_{10}$ hydroxyalkyl groups, in some embodiments $C_1$-$C_8$ alkyl or $C_1$-$C_8$ hydroxyalkyl groups, and in some embodiments, $C_2$-$C_6$ alkyl or $C_2$-$C_6$ hydroxyalkyl groups. Examples of suitable alkyl and hydroxyalkyl groups include, for instance, methyl, ethyl, iso-propyl, n-propyl, n-butyl, isobutyl, sec-butyl, tert-butyl, n-pentyl, n-hexyl, n-heptyl, n-octyl, n-decyl, 1-hydroxyethyl, 2-hydroxyethyl, 3-hydroxypropyl, 4-hydroxybutyl, and 5-hydroxypentyl groups. Thus, as indicated, the modified aliphatic-aromatic copolyester has a different chemical composition than an unmodified copolyester in terms of its terminal groups. The terminal groups may play a substantial role in determining the properties of the polymer, such as its reactivity, stability, etc.

Regardless of its particular structure, a new polymer species is formed during alcoholysis that has a molecular weight lower than that of the starting polyester. The weight average and/or number average molecular weights may, for instance, each be reduced so that the ratio of the starting copolyester molecular weight to the new molecular weight is at least about 1.1, in some embodiments at least about 1.4, and in some embodiments, at least about 1.6. For example, the modified aliphatic-aromatic copolyester may have a number average molecular weight ("$M_n$") ranging from about 10,000 to about 70,000 grams per mole, in some embodiments from about 20,000 to about 60,000 grams per mole, and in some embodiments, from about 30,000 to about 55,000 grams per mole. Likewise, the modified copolyester may also have a weight average molecular weight ("$M_w$") of from about 20,000 to about 125,000 grams per mole, in some embodiments from about 30,000 to about 110,000 grams per mole, and in some embodiments, from about 40,000 to about 90,000 grams per mole.

In addition to possessing a lower molecular weight, the modified aliphatic-aromatic copolyester may also have a lower apparent viscosity and higher melt flow index than the starting polyester. The apparent viscosity may for instance, be reduced so that the ratio of the starting copolyester viscosity to the modified copolyester viscosity is at least about 1.1, in some embodiments at least about 2, and in some embodiments, from about 10 to about 40. Likewise, the melt flow index may be increased so that the ratio of the modified copolyester melt flow index to the starting copolyester melt flow index is at least about 1.5, in some embodiments at least about 3, in some embodiments at least about 50, and in some embodiments, from about 100 to about 1000. In one particular embodiment, the modified copolyester may have an apparent viscosity of from about 10 to about 500 Pascal seconds (Pa·s), in some embodiments from about 20 to about 400 Pa·s, and in some embodiments, from about 30 to about 250 Pa·s, as determined at a temperature of 170° C. and a shear rate of 1000 sec$^{-1}$. The melt flow index (190° C., 2.16 kg) of the modified copolyester may range from about 5 to about 500 grams per 10 minutes, in some embodiments from about 10 to about 300 grams per 10 minutes, and in some embodiments, from about 20 to about 250 grams per 10 minutes. Of course, the extent to which the molecular weight, apparent viscosity, and/or melt flow index are altered by the alcoholysis reaction may vary depending on the intended application.

Although differing from the starting polymer in certain properties, the modified copolyester may nevertheless retain other properties of the starting polymer to enhance the flexibility and processability of the polymers. For example, the thermal characteristics (e.g., $T_g$, $T_m$, and latent heat of fusion) typically remain substantially the same as the starting polymer, such as within the ranges noted above. Further, even though the actual molecular weights may differ, the polydispersity index of the modified copolyester may remain substantially the same as the starting polymer, such as within the range of about 1.0 to about 3.0, in some embodiments from about 1.1 to about 2.0, and in some embodiments, from about 1.2 to about 1.8.

C. Catalyst

A catalyst may be employed to facilitate the modification of the alcoholysis reaction. The concentration of the catalyst may influence the extent to which the molecular weight is altered. For instance, higher catalyst concentrations generally result in a more significant decrease in molecular weight. Of course, too high of a catalyst concentration may also affect the physical characteristics of the resulting polymer. Thus, in most embodiments, the catalyst(s) are employed in an amount of about 50 to about 2000 parts per million ("ppm"), in some embodiments from about 100 to about 1000 ppm, and in some embodiments, from about 200 to about 1000 ppm, based on the weight of the starting aliphatic-aromatic copolyester.

Any known catalyst may be used in the present invention to accomplish the desired reaction. In one embodiment, for example, a transition metal catalyst may be employed, such as those based on Group IVB metals and/or Group IVA metals (e.g., alkoxides or salts). Titanium-, zirconium-, and/or tin-based metal catalysts are especially desirable and may include, for instance, titanium butoxide, titanium tetrabutoxide, titanium propoxide, titanium isopropoxide, titanium phenoxide, zirconium butoxide, dibutyltin oxide, dibutyltin diacetate, tin phenoxide, tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltindiacetate, dibutyltin diacetylacetonate, dibutyltin bis(o-phenylphenoxide), dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate.

D. Co-Solvent

The alcoholysis reaction is typically carried out in the absence of a solvent other than the alcohol reactant. Nevertheless, a co-solvent may be employed in some embodiments of the present invention. In one embodiment, for instance, the co-solvent may facilitate the dispersion of the catalyst in the reactant alcohol. Examples of suitable co-solvents may include ethers, such as diethyl ether, anisole, tetrahydrofuran, ethylene glycol dimethyl ether, triethylene glycol dimethyl ether, tetraethylene glycol dimethyl ether, dioxane, etc.; alcohols, such as methanol, ethanol, n-butanol, benzyl alcohol, ethylene glycol, diethylene glycol, etc.; phenols, such as phenol, etc.; carboxylic acids, such as formic acid, acetic acid, propionic acid, toluic acid, etc.; esters, such as methyl acetate, butyl acetate, benzyl benzoate, etc.; aromatic hydrocarbons, such as benzene, toluene, ethylbenzene, tetralin, etc.; aliphatic hydrocarbons, such as n-hexane, n-octane, cyclohexane, etc.; halogenated hydrocarbons, such as dichloromethane, trichloroethane, chlorobenzene, etc.; nitro compounds, such as nitromethane, nitrobenzene, etc.; carbamides, such as N,N-dimethylformamide, N,N-dimethylacetamide, N-methylpyrrolidone, etc.; ureas, such as N,N-dimethylimidazolidinone, etc.; sulfones, such as dimethyl sulfone, etc.; sulfoxides, such as dimethyl sulfoxide, etc.; lactones, such as butyrolactone, caprolactone, etc.; carbonic acid esters, such as dimethyl carbonate, ethylene carbonate, etc.; and so forth.

When employed, the co-solvent(s) may be employed in an amount from about 0.5 wt. % to about 20 wt. %, in some embodiments from about 0.8 wt. % to about 10 wt. %, and in some embodiments, from about 1 wt. % to about 5 wt. %, based on the weight of the reactive composition. It should be understood, however, that a co-solvent is not required. In fact, in some embodiments of the present invention, the reactive composition is substantially free of any co-solvents, e.g., less than about 0.5 wt. % of the reactive composition.

E. Other Ingredients

Other ingredients may of course be utilized for a variety of different reasons. For instance, a wetting agent may be employed in some embodiments of the present invention to improve hydrophilicity. Wetting agents suitable for use in the present invention are generally compatible with aliphatic-aromatic copolyesters. Examples of suitable wetting agents may include surfactants, such as UNITHOX® 480 and UNITHOX® 750 ethoxylated alcohols, or UNICID™ acid amide ethoxylates, all available from Petrolite Corporation of Tulsa, Okla. Other suitable wetting agents are described in U.S. Pat. No. 6,177,193 to Tsai, et al., which is incorporated herein in its entirety by reference thereto for all relevant purposes. Still other materials that may be used include, without limitation, melt stabilizers, processing stabilizers, heat stabilizers, light stabilizers, antioxidants, pigments, surfactants, waxes, flow promoters, plasticizers, particulates, and other materials added to enhance processability. When utilized, such additional ingredients are each typically present in an amount of less than about 5 wt. %, in some embodiments less than about 1 wt. %, and in some embodiments, less than about 0.5 wt. %, based on the weight of the aliphatic-aromatic copolyester starting polymer.

II. Reaction Technique

The alcoholysis reaction may be performed using any of a variety of known techniques. In one embodiment, for example, the reaction is conducted while the starting polymer is in the melt phase ("melt blending") to minimize the need for additional solvents and/or solvent removal processes. The raw materials (e.g., biodegradable polymer, alcohol, catalyst, etc.) may be supplied separately or in combination (e.g., in a solution). The raw materials may likewise be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing, which facilitate the alcoholysis reaction. For example, the copolyester may be fed to a feeding port of the twin-screw extruder and melted. Thereafter, the alcohol may be injected into the polymer melt. Alternatively, the alcohol may be separately fed into the extruder at a different point along its length. The catalyst, a mixture of two or more catalysts, or catalyst solutions may be injected separately or in combination with the alcohol or a mixture of two or more alcohols to the polymer melt.

Regardless of the particular melt blending technique chosen, the raw materials are blended under high shear/pressure and heat to ensure sufficient mixing for initiating the alcoholysis reaction. For example, melt blending may occur at a temperature of from about 50° C. to about 300° C., in some embodiments, from about 70° C. to about 250° C., and in some embodiments, from about 90° C. to about 180° C. Likewise, the apparent shear rate during melt blending may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

III. Fiber Formation

Fibers formed from the modified aliphatic-aromatic copolyester may generally have any desired configuration, including monocomponent, multicomponent (e.g., sheath-core configuration, side-by-side configuration, pie configuration, island-in-the-sea configuration, and so forth), and/or multiconstituent. In some embodiments, the fibers may contain one or more strength-enhancing polymers as a component (e.g., bicomponent) or constituent (e.g., biconstituent) to further enhance strength and other mechanical properties. The strength-enhancing polymer may be a thermoplastic polymer that is not generally considered biodegredable, such as polyolefins, e.g., polyethylene, polypropylene, polybutylene, and so forth; polytetrafluoroethylene; polyesters, e.g., polyethylene terephthalate, and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. More desirably, however, the strength-enhancing polymer is biodegradable, such as aliphatic polyesters, such as polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), and polycaprolactone, and succinate-based aliphatic polymers (e.g., polybutylene succinate, polybutylene succinate adipate, and polyethylene succinate); aromatic polyesters; or other aliphatic-aromatic copolyesters.

Any of a variety of processes may be used to form fibers in accordance with the present invention. Referring to FIG. 1, for example, one embodiment of a method for forming meltblown fibers is shown. Meltblown fibers form a structure having a small average pore size, which may be used to inhibit the passage of liquids and particles, while allowing gases (e.g., air and water vapor) to pass therethrough. To achieve the desired pore size, the meltblown fibers are typically "microfibers" in that they have an average size of 10 micrometers or less, in some embodiments about 7 micrometers or less, and in some embodiments, about 5 micrometers or less. The ability to produce such fine fibers may be facilitated in the present invention through the use of a modified copolyester having the desirable combination of low apparent viscosity and high melt flow index.

In FIG. 1, for instance, the raw materials (e.g., polymer, alcohol, catalyst, etc.) are fed into an extruder 12 from a hopper 10. The raw materials may be provided to the hopper 10 using any conventional technique and in any state. For example, the alcohol may be supplied as a vapor or liquid. Alternatively, the aliphatic-aromatic copolyester may be fed to the hopper 10, and the alcohol and optional catalyst (either in combination or separately) may be injected into the copolyester melt in the extruder 12 downstream from the hopper 10. The extruder 12 is driven by a motor 11 and heated to a temperature sufficient to extrude the polymer and to initiate the alcoholysis reaction. For example, the extruder 12 may employ one or multiple zones operating at a temperature of from about 50° C. to about 300° C., in some embodiments, from about 70° C. to about 250° C., and in some embodiments, from about 90° C. to about 180° C. Typical shear rates range from about 100 seconds$^{-1}$ to about 10,000 seconds-1, in some embodiments from about 500 seconds$^{-1}$ to about 5000 seconds$^{-1}$, and in some embodiments, from about 800 seconds$^{-1}$ to about 1200 seconds$^{-1}$.

Once formed, the modified aliphatic-aromatic copolyester may be subsequently fed to another extruder in a fiber formation line (e.g., extruder 12 of a meltblown spinning line). Alternatively, the modified aliphatic-aromatic copolymer may be directly formed into a fiber through supply to a die 14, which may be heated by a heater 16. It should be understood that other meltblown die tips may also be employed. As the polymer exits the die 14 at an orifice 19, high pressure fluid (e.g., heated air) supplied by conduits 13 attenuates and spreads the polymer stream into microfibers 18. Although not shown in FIG. 1, the die 14 may also be arranged adjacent to or near a chute through which other materials (e.g., cellulosic fibers, particles, etc.) traverse to intermix with the extruded polymer and form a "coform" web.

The microfibers 18 are randomly deposited onto a foraminous surface 20 (driven by rolls 21 and 23) with the aid of an optional suction box 15 to form a meltblown web 22. The distance between the die tip and the foraminous surface 20 is generally small to improve the uniformity of the fiber laydown. For example, the distance may be from about 1 to about 35 centimeters, and in some embodiments, from about 2.5 to about 15 centimeters. In FIG. 1, the direction of the arrow 28 shows the direction in which the web is formed (i.e., "machine direction") and arrow 30 shows a direction perpendicular to the machine direction (i.e., "cross-machine direction"). Optionally, the meltblown web 22 may then be compressed by rolls 24 and 26. The desired denier of the fibers may vary depending on the desired application. Typically, the fibers are formed to have a denier per filament of less than about 6, in some embodiments less than about 3, and in some embodiments, from about 0.5 to about 3. In addition, the fibers generally have an average diameter of from about 0.1 to about 20 micrometers, in some embodiments from about 0.5 to about 15 micrometers, and in some embodiments, from about 1 to about 10 micrometers.

Once formed, the nonwoven web may then be bonded using any conventional technique, such as with an adhesive or autogeneously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the aliphatic polyester(s) used to form the fibers. Suitable autogenous bonding techniques may include ultrasonic bonding, thermal bonding, through-air bonding, and so forth.

For instance, the web may be passed through a nip formed between a pair of rolls, one or both of which are heated to melt-fuse the fibers. One or both of the rolls may also contain intermittently raised bond points to provide an intermittent bonding pattern. The pattern of the raised points is generally selected so that the nonwoven web has a total bond area of less than about 50% (as determined by conventional optical microscopic methods), and in some embodiments, less than about 30%. Likewise, the bond density is also typically greater than about 100 bonds per square inch, and in some embodiments, from about 250 to about 500 pin bonds per square inch. Such a combination of total bond area and bond density may be achieved by bonding the web with a pin bond pattern having more than about 100 pin bonds per square inch that provides a total bond surface area less than about 30% when fully contacting a smooth anvil roll. In some embodiments, the bond pattern may have a pin bond density from about 250 to about 350 pin bonds per square inch and a total bond surface area from about 10% to about 25% when contacting a smooth anvil roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., U.S. Design Pat. No. 428,267 to Romano et al. and U.S. Design Pat. No. 390,708 to Brown, which are incorporated herein in their entirety by reference thereto for all purposes.

Due to the particular rheological and thermal properties of the modified aliphatic-aromatic copolyester used to form the fibers, the web bonding conditions (e.g., temperature and nip pressure) may be selected to cause the polymer to melt and flow at relatively low temperatures. For example, the bonding temperature (e.g., the temperature of the rollers) may be from about 50° C. to about 160° C., in some embodiments from about 80° C. to about 160° C., and in some embodiments, from about 100° C. to about 140° C. Likewise, the nip pressure may range from about 5 to about 150 pounds per square inch, in some embodiments, from about 10 to about 100 pounds per square inch, and in some embodiments, from about 30 to about 60 pounds per square inch.

In addition to meltblown webs, a variety of other nonwoven webs may also be formed from the modified aliphatic-aromatic copolyester in accordance with the present invention, such as spunbond webs, bonded carded webs, wet-laid webs, airlaid webs, coform webs, hydraulically entangled webs, etc. For example, the polymer may be extruded through a spinnerette, quenched and drawn into substantially continuous filaments, and randomly deposited onto a forming surface. Alternatively, the polymer may be formed into a carded web by placing bales of fibers formed from the blend into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

The fibers of the present invention may constitute the entire fibrous component of the nonwoven web or blended with other types of fibers (e.g., staple fibers, filaments, etc). When blended with other types of fibers, it is normally desired that the fibers of the present invention constitute from about 20 wt % to about 95 wt. %, in some embodiments from about 30 wt. % to about 90 wt. %, and in some embodiments, from about 40 wt. % to about 80 wt. % of the total amount of fibers employed in the nonwoven web. For example, additional monocomponent and/or multicomponent synthetic fibers may be utilized in the nonwoven web. Some suitable polymers that may be used to form the synthetic fibers include, but are not limited to: polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; etc. If desired, biodegradable polymers, such as poly(glycolic acid) (PGA), poly(lactic acid) (PLA), poly(β-malic acid) (PMLA), poly(ε-caprolactone) (PCL), poly(p-dioxanone) (PDS), poly (butylene succinate) (PBS), and poly(3-hydroxybutyrate) (PHB), may also be employed. Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth.

The fibers of the present invention may also be blended with pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Wash. under the trade designation of "NB-416." Another suitable pulp for use in the present invention is a bleached, sulfate wood pulp containing primarily softwood fibers that is available from Bowater Corp. with offices in Greenville, S.C. under the trade name CoosAbsorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability.

Nonwoven laminates may also be formed in which one or more layers are formed from the modified aliphatic-aromatic copolyester of the present invention. In one embodiment, for example, the nonwoven laminate contains a meltblown layer positioned between two spunbond layers to form a spunbond/meltblown/spunbond ("SMS") laminate. If desired, the meltblown layer may be formed from the modified aliphatic-aromatic copolyester. The spunbond layer may be formed from the modified copolyester, other biodegradable polymer(s), and/or any other polymer (e.g., polyolefins). Various techniques for forming SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the nonwoven web or laminate may be applied with various treatments to impart desirable characteristics. For example, the web may be treated with liquid-repellency additives, antistatic agents, surfactants, colorants, antifogging agents, fluorochemical blood or alcohol repellents, lubricants, and/or antimicrobial agents. In addition, the web may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. Nos. 4,215,682 to Kubik, et al.; 4,375,718 to Wadsworth; 4,592,815 to Nakao; 4,874,659 to Ando; 5,401,446 to Tsai, et al.; 5,883,026 to Reader, et al.; 5,908,598 to Rousseau, et al.; 6,365,088 to Knight, et al., which are incorporated herein in their entirety by reference thereto for all purposes.

The nonwoven web or laminate may be used in a wide variety of applications. For example, the web may be incorporated into a "medical product", such as gowns, surgical drapes, facemasks, head coverings, surgical caps, shoe coverings, sterilization wraps, warming blankets, heating pads, and so forth. Of course, the nonwoven web may also be used in various other articles. For example, the nonwoven web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, the nonwoven web of the present invention may be used to form an outer cover of an absorbent article.

The present invention may be better understood with reference to the following examples.

Test Methods

Molecular Weight:

The molecular weight distribution of a polymer was determined by gel permeation chromatography ("GPC"). The samples were initially prepared by adding 0.5% wt/v solutions of the sample polymers in chloroform to 40-milliliter glass vials. For example, 0.05±0.0005 grams of the polymer was added to 10 milliliters of chloroform. The prepared samples were placed on an orbital shaker and agitated overnight. The dissolved sample was filtered through a 0.45-micrometer PTFE membrane and analyzed using the following conditions:

Columns: Styragel HR 1, 2, 3, 4, & 5E (5 in series) at 41° C.
Solvent/Eluent: Chloroform @1.0 milliliter per minute HPLC: Waters 600E gradient pump and controller, Waters 717 auto sampler
Detector: Waters 2414 Differential Refractometer at sensitivity=30, at 40° C. and scale factor of 20
Sample Concentration: 0.5% of polymer "as is"
Injection Volume: 50 microliters
Calibration Standards Narrow MW polystyrene, 30-microliter injected volume.

Number Average Molecular Weight ($MW_n$), Weight Average Molecular Weight ($MW_w$) and first moment of viscosity average molecular weight ($MW_z$) were obtained.

Apparent Viscosity:

The rheological properties of polymer samples were determined using a Götffert Rheograph 2003 capillary rheometer with WinRHEO version 2.31 analysis software. The setup included a 2000-bar pressure transducer and a 30/1:0/180 roundhole capillary die. Sample loading was done by alternating between sample addition and packing with a ramrod. A 2-minute melt time preceded each test to allow the polymer to completely melt at the test temperature (usually 160 to 220° C.). The capillary rheometer determined the apparent viscosity (Pa·s) at various shear rates, such as 100, 200, 500, 1000, 2000, and 4000 $s^{-1}$. The resultant rheology curve of apparent shear rate versus apparent viscosity gave an indication of how the polymer would run at that temperature in an extrusion process.

Melt Flow Index:

The melt flow index is the weight of a polymer (in grams) forced through an extrusion rheometer orifice (0.0825-inch diameter) when subjected to a load of 2160 grams in 10 minutes, typically at 190° C. Unless otherwise indicated, the melt flow index was measured in accordance with ASTM Test Method D1238-E.

Thermal Properties:

The melting temperature ("$T_m$"), glass transition temperature ("$T_g$"), and latent heat of fusion ("$\Delta H_f$") were determined by differential scanning calorimetry (DSC). The differential scanning calorimeter was a THERMAL ANALYST 2910 Differential Scanning Calorimeter, which was outfitted with a liquid nitrogen cooling accessory and with a THERMAL ANALYST 2200 (version 8.10) analysis software program, both of which are available from T.A. Instruments Inc. of New Castle, Del. To avoid directly handling the samples, tweezers or other tools were used. The samples were placed into an aluminum pan and weighed to an accuracy of 0.01 milligram on an analytical balance. A lid was crimped over the material sample onto the pan. Typically, the resin pellets were placed directly in the weighing pan, and the fibers were cut to accommodate placement on the weighing pan and covering by the lid.

The differential scanning calorimeter was calibrated using an indium metal standard and a baseline correction was performed, as described in the operating manual for the differential scanning calorimeter. A material sample was placed into the test chamber of the differential scanning calorimeter for testing, and an empty pan is used as a reference. All testing was run with a 55-cubic centimeter per minute nitrogen (industrial grade) purge on the test chamber. For resin pellet samples, the heating and cooling program was a 2-cycle test that began with an equilibration of the chamber to −50° C., followed by a first heating period at a heating rate of 10° C. per minute to a temperature of 200° C., followed by equilibration of the sample at 200° C. for 3 minutes, followed by a first cooling period at a cooling rate of 20° C. per minute to a temperature of −50° C., followed by equilibration of the sample at −50° C. for 3 minutes, and then a second heating period at a heating rate of 10° C. per minute to a temperature of 200° C. For fiber samples, the heating and cooling program was a 1-cycle test that began with an equilibration of the chamber to −50° C., followed by a heating period at a heating rate of 20° C. per minute to a temperature of 200° C., followed by equilibration of the sample at 200° C. for 3 minutes, and then a cooling period at a cooling rate of 10° C. per minute to a temperature of −50° C. All testing was run with a 55-cubic centimeter per minute nitrogen (industrial grade) purge on the test chamber.

The results were then evaluated using the THERMAL ANALYST 2200 analysis software program, which identified and quantified the glass transition temperature of inflection, the endothermic and exothermic peaks, and the areas under the peaks on the DSC plots. The glass transition temperature was identified as the region on the plot-line where a distinct change in slope occurred, and the melting temperature was determined using an automatic inflection calculation. The areas under the peaks on the DSC plots were determined in terms of joules per gram of sample (J/g). For example, the endothermic heat of melting of a resin or fiber sample was determined by integrating the area of the endothermic peak. The area values were determined by converting the areas under the DSC plots (e.g. the area of the endotherm) into the units of joules per gram (J/g) using computer software.

Tensile Properties:

The strip tensile strength values were determined in substantial accordance with ASTM Standard D-5034. Specifically, a nonwoven web sample was cut or otherwise provided with size dimensions that measured 25 millimeters (width)× 127 millimeters (length). A constant-rate-of-extension type of tensile tester was employed. The tensile testing system was a Sintech Tensile Tester, which is available from Sintech Corp. of Cary, N.C. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run at a 300-millimeter per minute rate with a gauge length of 10.16 centimeters and a break sensitivity of 40%.

Five samples were tested by applying the test load along the machine-direction and five samples were tested by applying the test load along the cross direction. In addition to tensile strength, the peak load, peak elongation (i.e., % strain at peak load), and the energy to peak were measured. The peak strip tensile loads from each specimen tested were arithmetically averaged to determine the MD or CD tensile strength.

EXAMPLE 1

An aliphatic-aromatic copolyester resin was initially obtained from BASF under the designation ECOFLEX® F BX 7011. The copolyester resin was modified by melt blending with a reactant solution. For Samples 1 and 4 (see Table 1), the reactant solution contained 89 wt. % 1,4-butanediol and 11 wt. % acetone. For Samples 2, 3, 5, and 6 (see Table 1), the reactant solution contained 87 wt. % 1,4-butanediol, 11 wt. % acetone, and 2 wt. % dibutyltin diacetate (the catalyst). The solution was fed by an Eldex pump to a liquid injection port located at barrel #4 of a co-rotating, twin-screw extruder (USALAB Prism H16, diameter: 16 mm, L/D of 40/1) manufactured by Thermo Electron Corporation. The resin was fed to the twin screw extruder at barrel #1. The screw length was 25 inches. The extruder had one die opening having a diameter of 3 millimeters. Upon formation, the extruded resin was cooled on a fan-cooled conveyor belt and formed into pellets by a Conair pelletizer. Reactive extrusion parameters were monitored on the USALAB Prism H16 extruder during the reactive extrusion process. The conditions are shown below in Table 1.

TABLE 1

Reactive Extrusion Process Conditions for modifying Ecoflex F BX 7011 on a USALAB Prism H16

| Sample No. | Temperature (° C.) Zone 1, 2, 3-8, 9, 10 | | | | Screw Speed (rpm) | Resin Rate (lb/h) | Reactant (% of resin rate) |
|---|---|---|---|---|---|---|---|
| F BX 7011 | 90 | 125 | 165 | 125 | 110 | 150 | 2.6 0 |
| 1 | 90 | 125 | 165 | 125 | 110 | 150 | 2.6 4 (No catalyst) |
| 2 | 90 | 125 | 165 | 125 | 110 | 150 | 2.6 4 |
| 3 | 90 | 125 | 180 | 125 | 110 | 150 | 2.6 4 |
| 4 | 90 | 125 | 190 | 125 | 110 | 150 | 2.6 4 (No catalyst) |
| 5 | 90 | 125 | 190 | 125 | 110 | 150 | 2.6 4 |
| 6 | 90 | 125 | 200 | 125 | 110 | 150 | 2.6 4 |

Figure 2:
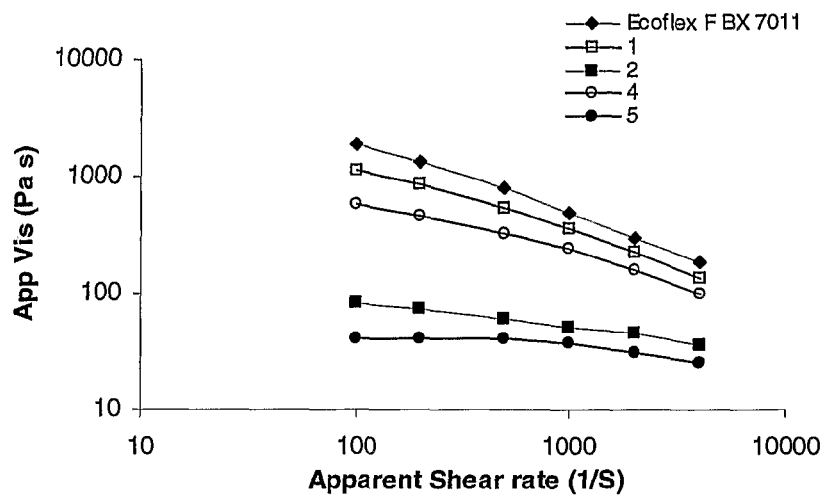
FIG. 2 is a graph depicting apparent viscosity versus various shear rates for the extruded resins of Example 1.

The melt rheology was studied for the unmodified ECOFLEX® F BX 7011 and Samples 1-6 (modified with 1,4 butanediol). The measurement was carried out on a Göettfert Rheograph 2003 (available from Göettfert of Rock Hill, S.C.) at 170° C. with a 30/1 (Length/Diameter) mm/mm die. The apparent melt viscosity was determined at apparent shear rates of 100, 200, 500, 1000, 2000 and 5000 s$^{-1}$. The apparent melt viscosities at the various apparent shear rates were plotted and the rheology curves were generated as shown in FIG. 2. As illustrated, the apparent viscosity of the control sample (unmodified ECOFLEX® resin) was much higher than the apparent viscosities of Samples 1-6. The melt flow indices of the samples were also determined with a Tinius Olsen Extrusion plastometer (170° C., 2.16 kg). Further, the samples were subjected to molecular weight (MW) analysis by GPC with narrow MW distribution polystyrenes as standards. The results are set forth below in Table 2.

TABLE 2

Properties of modified Ecoflex F BX 7011 on a USALAB Prism H16

| Sample No. | Apparent Viscosity (Pa · s at apparent shear rate of 1000/s) | Melt Flow rate (g/10 min at 170° C. and 2.16 kg) | Average Mol. Wt (g/mol) | | Poly-dispersity (Mw/Mn) |
|---|---|---|---|---|---|
| | | | Mw | Mn | |
| F BX 7011 | 498 | 1.65 | 125206 | 73548 | 1.7 |
| 1 | 365 | 9.6 | 114266 | 67937 | 1.68 |
| 2 | 51 | 230 | 77391 | 41544 | 1.86 |
| 3 | 37 | 377 | 71072 | 39767 | 1.79 |
| 4 | 241 | 14 | 109317 | 66507 | 1.64 |
| 5 | 38 | 475 | 65899 | 35529 | 1.85 |
| 6 | 22 | 571 | 56809 | 29316 | 1.94 |

As indicated, the melt flow indices of the modified resins (Samples 1-6) were significantly greater than the control sample. In addition, the weight average molecular weight ($M_w$) and number average molecular weight ($M_n$) were decreased in a controlled fashion, which confirmed that the increase in melt flow index was due to alcoholysis with butanediol. The resulting modified aliphatic-aromatic copolyesters had hydroxybutyl terminal groups.

EXAMPLE 2

The modification of ECOFLEX® F BX 7011 by monohydric alcohols was demonstrated with 1-butanol, 2-propanol, and 2-ethoxy-ethanol as examples of monohydric alcohols. The experimental set-up was the same as described in Example 1. The process conditions are shown in Table 3. Dibutyltin diacetate was the catalyst used. As shown in Table 3, the torque decreased as monohydric alcohol was fed to the extruder. The torque was further decreased as monohydric alcohol and catalyst were both fed to the extruder.

TABLE 3

Reactive Extrusion Conditions for modifying Ecoflex F BX 7011 on a USALAB Prism H16 with monohydric alcohols

| Sample I.D. | Temperature (° C.) Zone 1, 2, 3-8, 9, 10 | | | | Screw Speed (rpm) | Resin Rate (lb/h) | Reactant (% of resin rate) | Catalyst (% of resin rate) | Torque (%) |
|---|---|---|---|---|---|---|---|---|---|
| F BX 7011 | 90 | 125 | 180 | 125 | 110 | 150 | 2.5 | 0 | 0 | >100 |
| 7 | 90 | 125 | 180 | 125 | 110 | 150 | 2.5 | 3.4%, 2-Propanol | 0 | 90 |
| 8 | 90 | 125 | 180 | 125 | 110 | 150 | 2.5 | 3.4%, 2-Propanol | 0.1 | 80 |
| 9 | 90 | 125 | 180 | 125 | 110 | 150 | 2.5 | 3.6%, 1-Butanol | 0 | 72 |
| 10 | 90 | 125 | 180 | 125 | 110 | 150 | 2.5 | 3.6%, 1-Butanol | 0.1 | 54 |
| 11 | 90 | 125 | 180 | 125 | 110 | 150 | 2.5 | 4%, 2-Ethoxy-ethanol | 0 | 64 |
| 12 | 90 | 125 | 180 | 125 | 110 | 150 | 2.5 | 4%, 2-Ethoxy-ethanol | 0.1 | 58 |

The apparent viscosity and molecular weight were determined for each sample as described in Example 1. The results are shown below in Table 4.

TABLE 4

Properties of modified Ecoflex F BX 7011 with monohydric alcohols on a USALAB Prism H16

| Sample I.D. | Apparent Viscosity (Pa · s at apparent shear rate of 1000 1/s) | Average Mol. Wt (g/mol) | | Poly-dispersity (Mw/Mn) |
|---|---|---|---|---|
| | | Mw | Mn | |
| F BX 7011 | 376 | 128100 | 77200 | 1.66 |
| 7 | 364 | 120800 | 71800 | 1.68 |
| 8 | 273 | 115000 | 69400 | 1.66 |
| 9 | 292 | 115900 | 70800 | 1.64 |
| 10 | 126 | 89800 | 51000 | 1.76 |
| 11 | 324 | 116800 | 71000 | 1.64 |
| 12 | 215 | 104100 | 60500 | 1.72 |

As indicated, Samples 7-12 had lower apparent viscosities and molecular weights over the entire range of shear rates than the control sample. The resulting modified copolyesters had alkyl terminal groups that are compositionally different than the unmodified copolyester.

EXAMPLE 3

Modification of ECOFLEX® F BX 7011 with 1,4-butanediol was performed as described in Example 1 using titanium propoxide ("Ti-P"), titanium butoxide ("Ti-B") and titanium isopropoxide ("Ti-IsoP") catalysts. During the reactive extrusion process, the torques of the extruder were moderately decreased with the addition of only 1,4-butanediol, and further decreased with the addition of the titanium catalysts. The process conditions are shown in Table 5. The resulting modified copolyesters have hydroxybutyl terminal groups.

Figure 3:
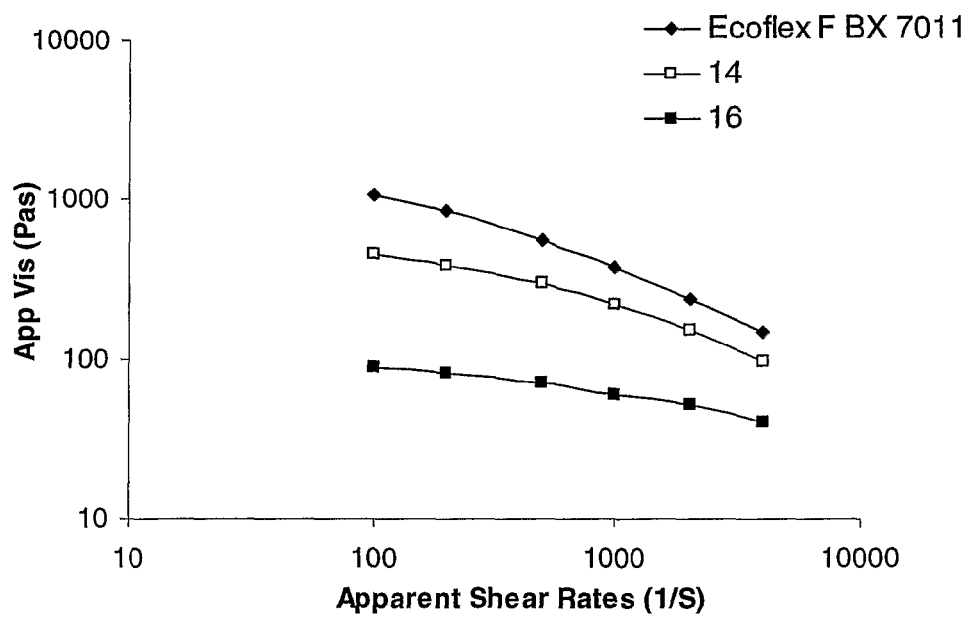
FIG. 3 is a graph depicting apparent viscosity versus various shear rates for the extruded resins of Example 3.

As shown in FIG. 3, the viscosity of Sample 16 (titanium propoxide catalyst) was significant lower than Sample 14 (no catalyst) over the entire range of shear rates. In addition, the molecular weights of Samples 13-20 were less than the control sample.

EXAMPLE 4

An aliphatic-aromatic copolyester resin was obtained from BASF under the designation ECOFLEX® F BX 7011. A reactant solution contained 87.5 wt. % 1,4-butanediol, 7.5 wt. % ethanol, and 5 wt. % titanium propoxide was made. A co-rotating, twin-screw extruder was employed (ZSK-30,

TABLE 5

Reactive Extrusion Process Conditions for modifying Ecoflex F BX 7011 on a USALAB Prism H16 with 1,4-butanediol and titanium catalysts

| Sample I.D. | Temperature (° C.) Zone 1, 2, 3-8, 9, 10 | | | | | Screw Speed (rpm) | Resin Rate (lb/h) | 1,4-butanediol (% of resin rate) | Catalyst (ppm of resin rate) | Torque (%) |
|---|---|---|---|---|---|---|---|---|---|---|
| F BX 7011 | 95 | 145 | 180 | 130 | 100 | 150 | 3 | 0 | 0 | >100 |
| 13 | 95 | 145 | 180 | 130 | 100 | 150 | 3 | 2 | 0 | 85 |
| 14 | 95 | 145 | 180 | 130 | 100 | 150 | 3 | 3.5 | 0 | 75 |
| 15 | 95 | 145 | 180 | 130 | 100 | 150 | 3 | 2 | 400, Ti-P | 69 |
| 16 | 95 | 145 | 180 | 130 | 100 | 150 | 3 | 3.5 | 700, Ti-P | 48 |
| 17 | 95 | 145 | 180 | 130 | 100 | 150 | 3 | 2 | 400, Ti-B | 76 |
| 18 | 95 | 145 | 180 | 130 | 100 | 150 | 3 | 3.5 | 700, Ti-B | 55 |
| 19 | 95 | 145 | 180 | 130 | 100 | 150 | 3 | 2 | 400, Ti-IsoP | 79 |
| 20 | 95 | 145 | 180 | 130 | 100 | 150 | 3 | 3.5 | 700, Ti-IsoP | 64 |

The apparent viscosity and molecular weight were determined for each sample as described in Example 1. The results are shown in FIG. 3 and Table 6.

TABLE 6

Properties of modified Ecoflex F BX 7011 with monohydric alcohols on a USALAB Prism H16

| Sample I.D. | Apparent Viscosity (Pa · s at apparent shear rate of 1000 1/s) | Average Mol. Wt (g/mol) | | Poly-dispersity (Mw/Mn) |
|---|---|---|---|---|
| | | Mw | Mn | |
| F BX 7011 | 376 | 128100 | 77200 | 1.66 |
| 13 | 297 | 112800 | 71000 | 1.7 |
| 14 | 219 | 102000 | 60100 | 1.83 |
| 15 | 198 | 97050 | 57050 | 1.74 |
| 16 | 60 | 69100 | 37600 | 1.67 |
| 17 | 218 | 103700 | 61800 | 1.6 |
| 18 | 95 | 89900 | 51600 | 1.7 |
| 19 | 243 | 110200 | 64100 | 1.68 |
| 20 | 87 | 100300 | 59900 | 1.72 | diameter of 30 millimeters) that was manufactured by Werner and Pfleiderer Corporation of Ramsey, N.J. The screw length was 1328 millimeters. The extruder had 14 barrels, numbered consecutively 1-14 from the feed hopper to the die. The first barrel (#1) received the ECOFLEX® BFX 7011 resin via a volumetric feeder at a throughput of 30 pounds per hour. The fifth barrel (#5) received the reactant solution via a pressurized injector connected with an Eldex pump at a final rate of 0 to 1 wt. % 1,4-butanediol and 0 to 700 parts per million ("ppm") titanium propoxide, respectively. The screw speed was 150 revolutions per minute ("rpm"). The die used to extrude the resin had 4 die openings (6 millimeters in diameter) that were separated by 3 millimeters. Upon formation, the extruded resin was cooled on a fan-cooled conveyor belt and formed into pellets by a Conair pelletizer. Reactive extrusion parameters were monitored during the reactive extrusion process. The conditions are shown below in Table 7.

TABLE 7

Process Conditions for Reactive Extrusion of Ecoflex F BX 7011 with 1,4-Butanediol on a ZSK-30 Extruder

| Samples No. | Reactants | | | Extruder speed (rpm) | Extruder temperature profile (° C.) | | | | | | | | | Torque (%) |
|---|---|---|---|---|---|---|---|---|---|---|---|---|---|---|
| | Resin feeding rate (lb/h) | Butanediol (%) | Titanium Propoxide (ppm) | | $T_1$ | $T_2$ | $T_3$ | $T_4$ | $T_5$ | $T_6$ | $T_7$ | $T_{melt}$ | $P_{melt}$ | |
| F BX 7011 | 30 | 0 | 0 | 150 | 160 | 170 | 185 | 185 | 185 | 185 | 100 | 116 | 400 | >100 |
| 21 | 30 | 1 | 0 | 150 | 160 | 171 | 184 | 185 | 185 | 185 | 100 | 108 | 300 | >100 |

TABLE 7-continued

Process Conditions for Reactive Extrusion of Ecoflex F BX 7011 with 1,4-Butanediol on a ZSK-30 Extruder

| Samples No. | Reactants | | | Extruder speed | Extruder temperature profile (° C.) | | | | | | | | | Torque |
|---|---|---|---|---|---|---|---|---|---|---|---|---|---|---|
| | Resin feeding rate (lb/h) | Butanediol (%) | Titanium Propoxide (ppm) | (rpm) | $T_1$ | $T_2$ | $T_3$ | $T_4$ | $T_5$ | $T_6$ | $T_7$ | $T_{melt}$ | $P_{melt}$ | (%) |
| 22 | 30 | 0.75 | 375 | 150 | 160 | 170 | 185 | 185 | 185 | 185 | 100 | 110 | 70 | 85-90 |
| 23 | 30 | 1 | 700 | 150 | 160 | 170 | 185 | 185 | 185 | 185 | 100 | 110 | 30 | 66-72 |

As indicated, the addition of 1 wt. % butanediol alone (Sample 21) did not significantly decrease the torque of the control sample, although the die pressure did drop from 300 to 130 pounds per square inch ("psi"). With the addition of 1 wt. % 1,4-butanediol and 700 ppm titanium propoxide (Sample 23), both the torque and die pressure decreased significantly to 66-72% and 30 psi, respectively. The torque and die pressure could be proportionally adjusted with the change of reactant and catalyst.

Figure 4:
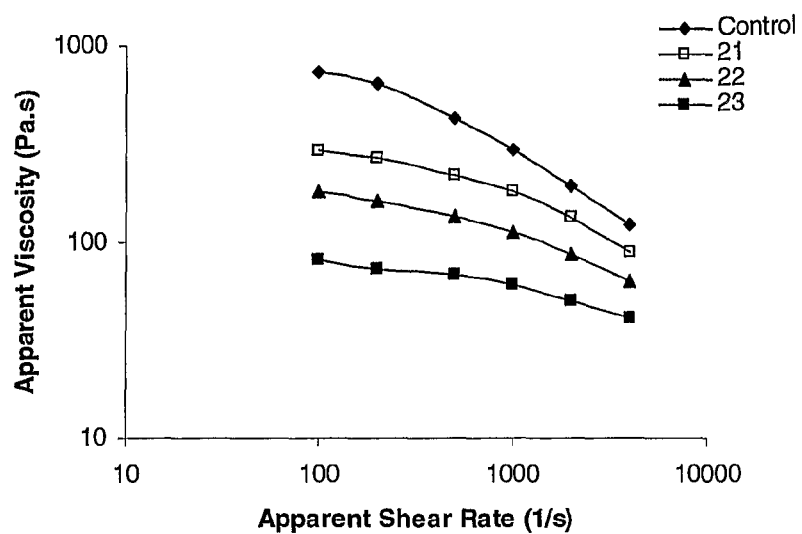
FIG. 4 is a graph depicting apparent viscosity versus various shear rates for the extruded resins of Example 4.

Melt rheology tests were also performed with the control sample and Samples 21-23 on a Göettfert Rheograph 2003 (available from Göettfert in Rock Hill, S.C.) at 180° C. and 190° C. with 30/1 (Length/Diameter) mm/mm die. The apparent melt viscosity was determined at apparent shear rates of 100, 200, 500, 1000, 2000 and 4000 $s^{-1}$. The results are shown in FIG. 4. As indicated, Samples 21-23 had much lower apparent viscosities over the entire range of shear rates than the control sample. The melt flow index of the sample was determined by the method of ASTM D1239, with a Tinius Olsen Extrusion Plastometer at 190° C. and 2.16 kg. Further, the samples were subjected to molecular weight (MW) analysis by GPC with narrow MW polystyrenes as standards. The results are set forth below in Table 8.

TABLE 8

Properties of unmodified and modified Ecoflex F BX 7011 on a ZSK-30

| Sample No. | Apparent Viscosity (Pa·s at apparent shear rate of 1000/s at 180° C.) | Melt Flow rate (g/10 min at 190° C. and 2.16 kg) | Average Mol. Wt (g/mol) | | Poly-dispersity (Mw/Mn) |
|---|---|---|---|---|---|
| | | | Mw | Mn | |
| F BX 7011 Control | 321 | 4.5 | 125200 | 73500 | 1.7 |
| Control | 294 | 6.8 | 117900 | 72100 | 1.64 |
| 21 | 182 | 24 | 100400 | 60500 | 1.66 |
| 22 | 112 | 68 | 82800 | 46600 | 1.78 |
| 23 | 61 | 169 | 68900 | 37600 | 1.83 |

As indicated, the melt flow indices of the modified resins (Samples 21-23) were significantly greater than the control sample. In addition, the weight average molecular weight ($M_w$) and number average molecular weight ($M_n$) were decreased in a controlled fashion, which confirmed that the increase in melt flow index was due to alcoholysis with butanediol catalyzed. Table 9, which is set forth below, also lists the data from DSC analysis of the control sample and Samples 21-23.

TABLE 9

DSC Analysis

| Sample | Glass transition temperature, $T_g$ (° C.) | Melting Peak Temperature, $T_m$ (° C.) | Enthalpy of melting (J/g) |
|---|---|---|---|
| Ecoflex ® F BX 7011 | −30.1 | 123.3 | 11.7 |
| Control | −31.5 | 123.5 | 10.1 |
| 21 | −35.1 | 127 | 10.7 |
| 22 | −32.5 | 124.7 | 11.6 |
| 23 | −34.2 | 125.1 | 12 |

As indicated, Samples 22 and 23 (modified with 1,4-butanediol) exhibited little change in their $T_g$ and $T_m$ compared with the control samples.

EXAMPLE 5

A modified resin of Example 4 (Sample 23) was used to form a meltblown ("MB") web. Meltblown spinning was conducted with a pilot line that included a 1.75" Killion extruder with a single screw diameter of 1.75 inches (Verona, N.Y.); a 10-feet hose from Dekoron/Unitherm (Riviera Beach, Fla.); and a 14-inch meltblown die with an 11.5-inch spray and an orifice size of 0.015 inch. The modified resin was fed via gravity into the extruder and then transferred into the hose connected with the meltblown die. Table 10 shows the process conditions used during spinning. The temperatures are given in ° F.

TABLE 10

1,4-Butanediol modified BFX 7011 MB spinning conditions

| Extruder | | | | | | | | | Primary Air | |
|---|---|---|---|---|---|---|---|---|---|---|
| | | | | Screw | | | | | | |
| Zone 1 (F.) | Zone 2 (F.) | Zone 3 (F.) | Zone 4 (F.) | Speed (rpm) | Torque (Amps) | Pressure (Psi) | Hose (F.) | Die (F.) | Temperature (F.) | Pressure (Psi) |
| 200 | 300 | 310 | 320 | 3 | 4 | 130 | 320 | 350 | 375 | 30 |

Figure 5:
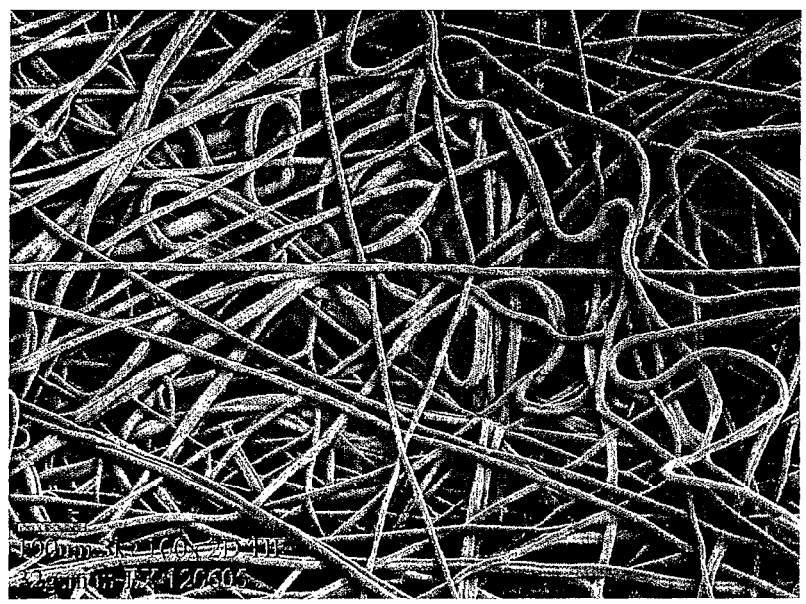
FIG. 5 shows an SEM microphotograph (100×) of a meltblown web formed in Example 5 (32 gsm sample in Table 11)
Figure 6:
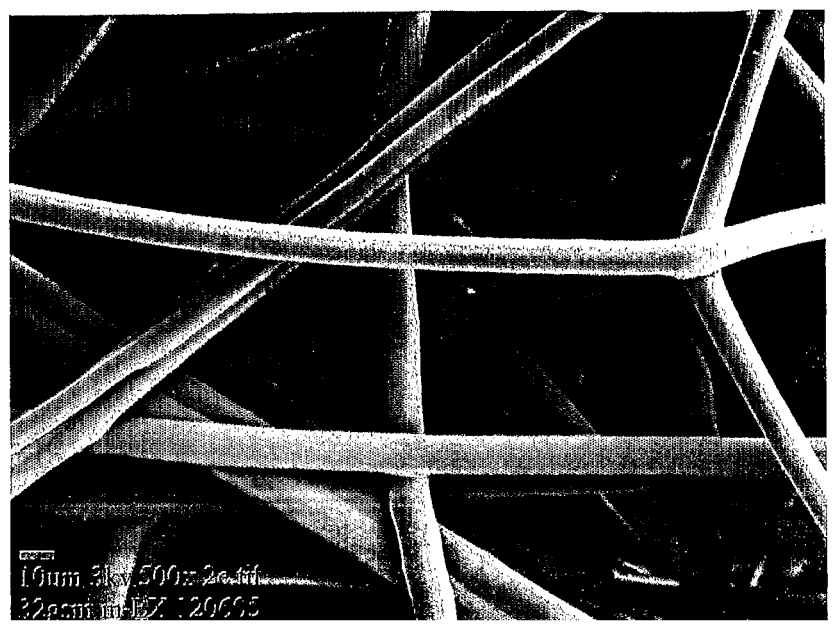
FIG. 6 shows an SEM microphotograph (500×) of a meltblown web formed in Example 5 (32 gsm sample in Table 11).

A fiber web sample was collected and analyzed with an electronic scanning microscope ("SEM") at different magnitudes. A micron scale bar was imprinted on each photo to permit measurements and comparisons. FIGS. 5 and 6 show the images of the fiber web at 100× and 500×, respectively. The fiber webs were also collected for tensile analysis. The tensile properties of the modified copolyester meltblown nonwoven samples of different basis weights were tested. The results are listed in Table 11. SD is standard deviation. "Peak Load" is given in units of pounds-force (lbf), and "Energy to Peak" is given in units of pound-force*inch (lbf*in).

TABLE 11

Modified Ecoflex F BX 7011 MB samples measured with 1" × 6" strips

| Sample | Basis Weight (gsm) | Peak Load (lbf) | | Strain at Peak (%) | | Energy to Peak (lbf * in) | |
|---|---|---|---|---|---|---|---|
| | | Mean | SD | Mean | SD | Mean | SD |
| Machine Direction | | | | | | | |
| 11 gsm | 11.9 | 0.3 | 0.06 | 131.9 | 12.5 | 1.28 | 0.24 |
| 22 gsm | 23.8 | 0.62 | 0.04 | 225.2 | 12.2 | 4.5 | 0.22 |
| 32 gsm | 29 | 0.91 | 0.1 | 310 | 53.8 | 9.02 | 2.5 |
| Cross Direction | | | | | | | |
| 11 gsm | 11.4 | 0.13 | 0.01 | 108 | 13.2 | 0.36 | 0.06 |
| 22 gsm | 23.8 | 0.35 | 0.01 | 187.6 | 6.9 | 1.91 | 0.11 |
| 32 gsm | 28.4 | 0.5 | 0.05 | 241.8 | 57.3 | 3.68 | 1.2 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a biodegradable polymer for use in fiber formation, the method comprising melt blending a first aliphatic-aromatic copolyester with at least one alcohol so that the copolyester undergoes an alcoholysis reaction, wherein a catalyst is employed to facilitate the alcoholysis reaction, the alcoholysis reaction resulting in a modified, second aliphatic-aromatic copolyester having a melt flow index that is greater than the melt flow index of the first aliphatic-aromatic copolyester, determined at a load of 2160 grams and temperature of 190° C. in accordance with ASTM Test Method D1238-E.

2. The method of claim 1, wherein a ratio of the melt flow index of the second aliphatic-aromatic copolyester to the melt flow index of the first aliphatic-aromatic copolyester is at least about 1.5.

3. The method of claim 1, wherein a ratio of the melt flow index of the second aliphatic-aromatic copolyester to the melt flow index of the first aliphatic-aromatic copolyester is at least about 50.

4. The method of claim 1, wherein a ratio of an apparent viscosity of the first aliphatic-aromatic copolyester to an apparent viscosity of the second aliphatic-aromatic copolyester is at least about 1.1, determined at a temperature of 170° C. and a shear rate of 1000 sec$^{-1}$.

5. The method of claim 1, wherein a ratio of an apparent viscosity of the first aliphatic-aromatic copolyester to an apparent viscosity of the second aliphatic-aromatic copolyester is at least about 2, determined at a temperature of 170° C. and a shear rate of 1000 sec$^{-1}$.

6. The method of claim 1, wherein the second aliphatic-aromatic copolyester has a number average molecular weight of from about 10,000 to about 70,000 grams per mole and a weight average molecular weight of from about 20,000 to about 125,000 grams per mole.

7. The method of claim 1, wherein the second aliphatic-aromatic copolyester has a number average molecular weight of from about 20,000 to about 60,000 grams per mole and a weight average molecular weight of from about 30,000 to about 110,000 grams per mole.

8. The method of claim 1, wherein a polydispersity index of the first aliphatic-aromatic copolyester and the second aliphatic-aromatic copolyester is from about 1.2 to about 2.0.

9. The method of claim 1, wherein the first aliphatic-aromatic copolyester and second aliphatic-aromatic copolyester both have a melting point of from about 80° C. to about 160° C.

10. The method of claim 1, wherein the first aliphatic-aromatic copolyester and second aliphatic-aromatic copolyester both have a glass transition temperature of about 0° C. or less.

11. The method of claim 1, wherein the melt flow index of the second aliphatic-aromatic copolyester is from about 5 to about 500 grams per 10 minutes.

12. The method of claim 1, wherein the melt flow index of the second aliphatic-aromatic copolyester is from about 20 to about 250 grams per 10 minutes.

13. The method of claim 1, wherein the second aliphatic-aromatic copolyester has an apparent viscosity of from about 10 to about 500 Pascal-seconds, determined at a temperature of 170° C. and a shear rate of 1000 sec$^{-1}$.

14. The method of claim 1, wherein the second aliphatic-aromatic copolyester has an apparent viscosity of from about 30 to about 250 Pascal-seconds, determined at a temperature of 170° C. and a shear rate of 1000 sec$^{-1}$.

15. The method of claim 1, wherein the second aliphatic-aromatic copolyester is terminated with an alkyl group, hydroxyalkyl group, or a combination thereof.

16. The method of claim 15, wherein the second aliphatic-aromatic copolyester has the following general structure:

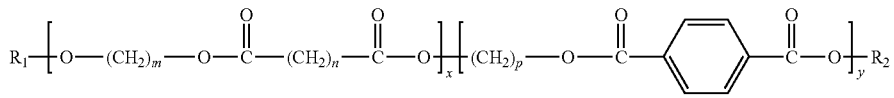

wherein, m is an integer from 2 to 10,
n is an integer from 0 to 18,
p is an integer from 2 to 10,
x is an integer greater than 1;
y is an integer greater than 1; and
$R_1$ and $R_2$ are independently selected from hydrogen; hydroxyl groups; straight chain or branched, substituted or unsubstituted $C_1$-$C_{10}$ alkyl groups; and straight chain or branched, substituted or unsubstituted $C_1$-$C_{10}$ hydroxalkyl groups.

17. The method of claim 16, wherein m and n are each from 2 to 4.

18. The method of claim 1, wherein the first aliphatic-aromatic copolyester is polybutylene adipate terephthalate.

19. The method of claim 1, wherein the alcohol is employed in an amount of from about 0.1 wt. % to about 20 wt. %, based on the weight of the first aliphatic-aromatic copolyester.

20. The method of claim 1, wherein the alcohol is employed in an amount of from about 0.5 wt. % to about 5 wt. %, based on the weight of the first aliphatic-aromatic copolyester.

21. The method of claim 1, wherein the alcohol is a monohydric alcohol.

22. The method of claim 1, wherein the alcohol is a polyhydric alcohol.

23. The method of claim 22, wherein the alcohol is a dihydric alcohol.

24. The method of claim 1, wherein the catalyst is a transition metal catalyst based on a Group IVA metal, a Group IVB metal, or a combination thereof.

25. The method of claim 1, wherein the catalyst is employed in an amount of from about 50 to about 2000 parts per million of the first aliphatic-aromatic copolyester.

26. The method of claim 1, wherein the alcoholysis reaction is conducted in the presence of a solvent.

27. The method of claim 1, wherein melt blending occurs at a temperature of from about 50° C. to about 300° C. and an apparent shear rate of from about 100 seconds$^{-1}$ to about 10,000 seconds$^{-1}$.

28. The method of claim 1, wherein melt blending occurs at a temperature of from about 90° C. to about 180° C. and an apparent shear rate of from about 800 seconds$^{-1}$ to about 1200 seconds$^{-1}$.

29. The method of claim 1, wherein melt blending occurs within an extruder.

30. The method of claim 1, wherein the second aliphatic-aromatic copolyester is extruded through a meltblowing die.

* * * * *